United States Patent
Fukui et al.

(10) Patent No.: US 11,904,849 B2
(45) Date of Patent: Feb. 20, 2024

(54) VEHICLE CONTROL APPARATUS

(71) Applicants: TOYOTA JIDOSHA KABUSHIKI KAISHA, Toyota (JP); Continental Automotive Corporation, Yokohama (JP)

(72) Inventors: Yusuke Fukui, Toyota (JP); Yumi Shimanaka, Kasugai (JP); Akshay Rajendra, Frankfurt (DE); Michael Patzelt, Frankfurt (DE)

(73) Assignees: TOYOTA JIDOSHA KABUSHIKI KAISHA, Toyota (JP); CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 86 days.

(21) Appl. No.: 17/347,670

(22) Filed: Jun. 15, 2021

(65) Prior Publication Data

US 2022/0017078 A1    Jan. 20, 2022

(30) Foreign Application Priority Data

Jul. 16, 2020 (JP) .................................. 2020-121849

(51) Int. Cl.
    *B60W 30/09* (2012.01)
    *B60W 30/095* (2012.01)
    *B60W 40/105* (2012.01)

(52) U.S. Cl.
    CPC ........ *B60W 30/09* (2013.01); *B60W 30/0956* (2013.01); *B60W 40/105* (2013.01); *B60W 2554/4041* (2020.02); *B60W 2554/80* (2020.02)

(58) Field of Classification Search
    CPC ............ B60W 30/0956; B60W 30/09; B60W 2554/4041; B60W 2554/80; B60W 40/105
    See application file for complete search history.

(56) References Cited

U.S. PATENT DOCUMENTS 10,810,877 B2 * 10/2020 Fukunaga ............. B60W 10/20
11,577,719 B2 * 2/2023 Tanahashi ............. B60W 10/20
(Continued)

FOREIGN PATENT DOCUMENTS

CN      109017791 A      12/2018
JP      2017-134518 A      8/2017

*Primary Examiner* — Tarek Elarabi
(74) *Attorney, Agent, or Firm* — Sughrue Mion, PLLC

(57) ABSTRACT

A vehicle control apparatus determines that a control start condition is satisfied when there is an object in an area of a moving route of the own vehicle and determine that a control forbidding condition is satisfied when there is an oncoming vehicle which satisfies a predetermined moving condition that the oncoming vehicle moves in an oncoming lane next to a moving lane of the own vehicle and approaches the own vehicle. The vehicle control apparatus determines that the control forbidding condition is not satisfied when a forbidding cancelling condition is satisfied, the forbidding cancelling condition being satisfied when a first me elapses since determining that the oncoming vehicle satisfying the predetermined moving condition disappears after determining that the control forbidding condition is satisfied and executes the steering control when the control start condition is satisfied, and the control forbidding condition is not satisfied.

9 Claims, 8 Drawing Sheets

(56) References Cited

U.S. PATENT DOCUMENTS

| | | |
|---|---|---|
| 2017/0210383 A1 | 7/2017 | Nishimura |
| 2018/0354510 A1 | 12/2018 | Miyata |
| 2018/0357903 A1* | 12/2018 | Fukunaga .............. G08G 1/166 |
| 2020/0247399 A1* | 8/2020 | Tanahashi ......... B60W 60/0016 |
| 2022/0017145 A1* | 1/2022 | Yasui ................... B62D 15/025 |

* cited by examiner

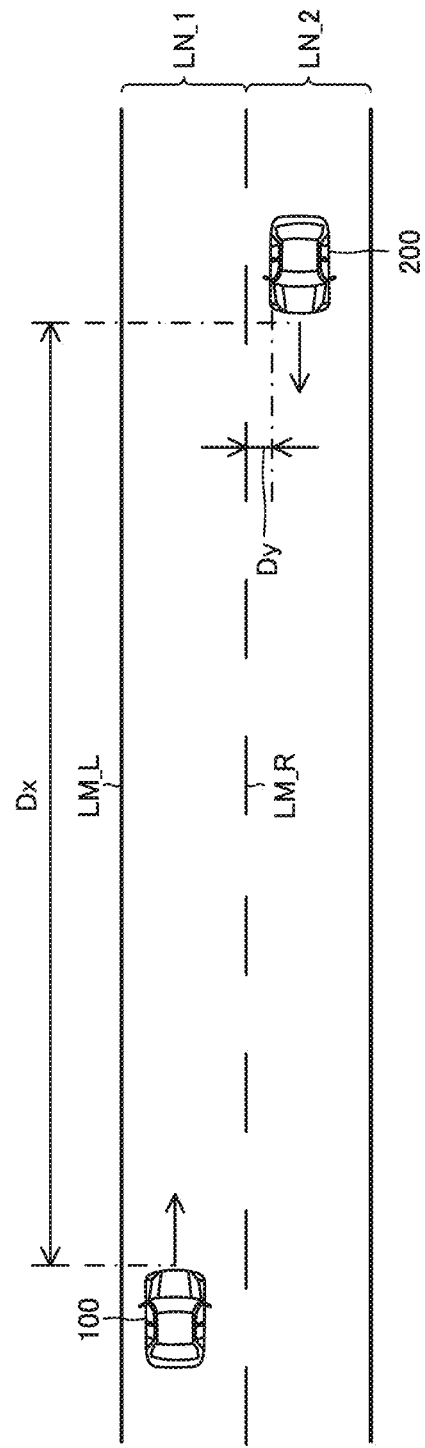

VEHICLE CONTROL APPARATUS

BACKGROUND

Field

The invention relates to a vehicle control apparatus.

Description of the Related Art

There is known a vehicle control apparatus which executes a steering control of automatically steering an own vehicle to avoid a collision of the own vehicle with an object when determining that there is the object on a moving route of the own vehicle, and the own vehicle probably collides with the object.

In addition, as the vehicle control apparatus, there is known a vehicle control apparatus which does not execute the steering control when there is an object moving in the same direction as the moving direction of the own vehicle in a moving lane of the own vehicle, and executing the steering control probably leads to the collision of the own vehicle with the object (for example, see JP 2017-134518 A).

If the steering control is executed when an oncoming vehicle approaches the own vehicle, the own vehicle may contact to the oncoming vehicle, or the own vehicle may pass just near the oncoming vehicle. Thus, it is preferred that the steering control is not executed when there is an oncoming vehicle approaching the own vehicle. In this connection, if a process of determining whether there is an oncoming vehicle, is performed by using camera image information acquired by a camera and/or radar information acquired by radar sensors, it may be determined that there is an oncoming vehicle although there is no oncoming vehicle, or it may be determined that there is no oncoming vehicle although there is an oncoming vehicle due to low level of the camera and/or the radar sensors detecting the oncoming vehicles. Thus, if the vehicle control apparatus is configured not to execute the steering control when there is an oncoming vehicle, the vehicle control apparatus may not execute the steering control although there is no oncoming vehicle, or the vehicle control apparatus may execute the steering control although there is an oncoming vehicle.

SUMMARY

The invention has been made for solving the problems described above. An object of the invention is to provide a vehicle control apparatus which surely determines whether there is an oncoming vehicle and executes the steering control.

A vehicle control apparatus according to the invention comprises (i) at least one sensor which detects own vehicle forward information on a situation ahead of an own vehicle, and (ii) an electronic control unit configured to execute a steering control for avoiding a collision of the own vehicle with an object recognized, based on the own vehicle forward information.

According to the invention, the electronic control unit is configured to determine that a control start condition is satisfied when there is an object in an area of a moving route of the own vehicle. In addition, the electronic control unit is configured to determine that a control forbidding condition is satisfied when there is an oncoming vehicle which satisfies a predetermined moving condition that the oncoming vehicle moves in an oncoming lane next to a moving lane of the own vehicle and approaches the own vehicle. In addition, the electronic control unit is configured to determine that the control forbidding condition is not satisfied when a forbidding cancelling condition is satisfied. The forbidding cancelling condition is satisfied when a first time elapses since the electronic control unit determines that the oncoming vehicle satisfying the predetermined moving condition disappears after the electronic control unit determines that the control forbidding condition is satisfied. In addition, the electronic control unit is configured to execute the steering control when the control start condition is satisfied, and the control forbidding condition is not satisfied.

Thereby, when the control forbidding condition is satisfied, the steering control is not executed. That is, when the own vehicle may collide with or contact to the oncoming vehicle, or the own vehicle may pass just near the oncoming vehicle if the steering control is executed, and the own vehicle moves, avoiding the collision of the own vehicle with the oncoming vehicle, the steering control is not executed. Thus, the collision of the own vehicle with the object can be safely avoided.

According to an aspect of the invention, the predetermined moving condition may include a condition that a distance between the own vehicle and the oncoming vehicle in a direction which the moving lane of the own vehicle extends, is equal to or shorter than a first distance. Thereby, the electronic control unit determines that there is an oncoming vehicle satisfying the predetermined moving condition when there is an oncoming vehicle which has approached the own vehicle at a point having a certain distance from the own vehicle. Thus, whether the oncoming vehicle is dangerous for the own vehicle if the steering control is executed, can be determined with higher accuracy.

According to another aspect of the invention, the predetermined moving condition may include a condition that a moving speed of the oncoming vehicle is equal to or higher than a predetermined speed. Thereby, the electronic control unit determines that there is an oncoming vehicle satisfying the predetermined moving condition when there is an oncoming vehicle having a relatively high moving speed. Thus, whether the oncoming vehicle is dangerous for the own vehicle if the steering control is executed, can be determined with higher accuracy.

According to further another aspect of the invention, the predetermined moving condition may include a condition that a distance between (i) a lane marking separating the moving lane of the own vehicle from the oncoming lane and (ii) the oncoming vehicle, is equal to or longer than a second distance. Thereby, the electronic control unit determines that there is an oncoming vehicle satisfying the predetermined moving condition when there is an oncoming vehicle moving near the moving lane of the own vehicle. Thus, whether the oncoming vehicle is dangerous for the own vehicle if the steering control is executed, can be determined with higher, accuracy.

According to further another aspect of the invention, the predetermined moving condition may include a condition that the electronic control unit has determined for a second time that there is the oncoming vehicle. Thereby, the electronic control unit determines that there is an oncoming vehicle satisfying the predetermined moving condition when there is an oncoming vehicle determined as existing for a certain time. Thus, whether the oncoming vehicle is dangerous for the own vehicle if the steering control is executed, can be determined with higher accuracy.

According to further another aspect of the invention, the electronic control unit may be configured to set a route of moving the own vehicle for avoiding the collision of the own vehicle to the object as a recommended route when the control start condition is satisfied. In this case, the electronic control unit may be configured to execute the steering control so as to assist operations to a steering wheel of the own vehicle performed by a driver of the own vehicle to move the own vehicle along the recommended route. Thereby, the steering control is executed with assisting steering operations performed by the driver to avoid the collision of the own vehicle with the object.

According to further another aspect of the invention, the predetermined moving condition may include (i) a condition that the recommended route is a route passing a right side of the object, and the oncoming lane is next to and on a right side of the moving lane of the own vehicle and (ii) a condition that the recommended route is a route passing a left side of the object, and the oncoming lane is next to and on a left side of the moving lane of the own vehicle. Thereby, the steering control is executed when there is no probability that the own vehicle collides with or contacts to the oncoming vehicle, or passes just near the oncoming vehicle if the steering control is executed.

According to further another aspect of the invention, the electronic control unit may be configured to set a route of moving the own vehicle for avoiding the collision of the own vehicle to the object as a target route when the control start condition is satisfied. In addition, the electronic control unit may be configured to execute the steering control so as to move the own vehicle along the target route. Thereby, the collision of the own vehicle with the object is avoided, independently of the steering operation performed by the driver. Thus, the collision of the own vehicle with the object can be surely avoided.

According to further another aspect of the invention, the predetermined moving condition may include (i) a condition that the target route is a route passing a right side of the object, and the oncoming lane is next to and on a right side of the moving lane of the own vehicle and (ii) a condition that the target route is a route passing a left side of the object, and the oncoming lane is next to and on a left side of the moving lane of the own vehicle, Thereby, the steering control is executed when there is no probability that the own vehicle collides with or contacts to the oncoming vehicle, or passes just near the oncoming vehicle if the steering control is executed.

Elements of the invention are not limited to elements of embodiments and modified examples of the invention described along with the drawings. The other objects, features and accompanied advantages of the invention can be easily understood from the embodiments and the modified examples of the invention.

BRIEF DESCRIPTION OF THE DRAWINGS

FIG. 4 is a view showing a distance between the own vehicle and an oncoming vehicle and a distance between the oncoming vehicle and the white line.

DESCRIPTION OF THE EMBODIMENTS

Figure 1:
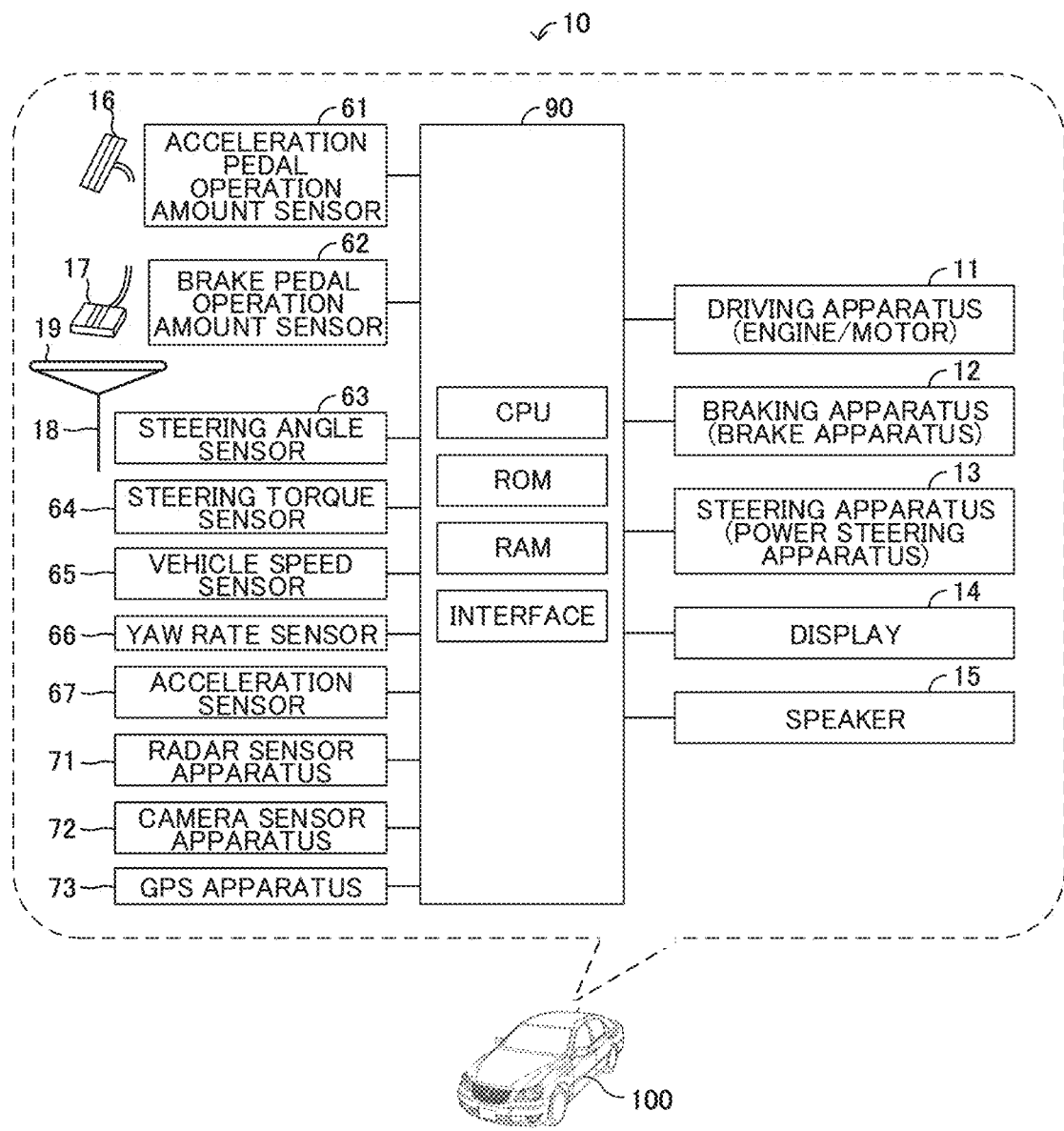
FIG. 1 is a view showing a vehicle control apparatus according to an embodiment of the invention and an own vehicle installed with the vehicle control apparatus.

Below, a vehicle control apparatus according to an embodiment of the invention will be described with reference to the drawings. As shown in FIG. 1, the vehicle control apparatus 10 according to the embodiment of the invention is installed on the own vehicle 100.

<ECU>

As shown in FIG. 1, the vehicle control apparatus 10 includes an ECU 90, ECU stands for electronic control unit. The ECU 90 includes a micro-computer as a main component. The micro-computer includes a CPU, a ROM, a RAM, a non-volatile memory, and an interface. The CPU is configured or programmed to realize various functions by executing instructions, or programs, or routines stored in the ROM.

<Driving Apparatus, Etc.>

A driving apparatus 11, a braking apparatus 12 (or a brake apparatus), and a steering apparatus 13 (or a power steering apparatus) are installed on the own vehicle 100.

The driving apparatus 11 generates a driving force (or a driving torque) for moving the own vehicle 100 and applies the generated driving force to the own vehicle 100 (in particular; driven wheels of the own vehicle 100). The driving apparatus 11 is, for example, an internal combustion engine and/or an electric motor. The driving apparatus 11 is electrically connected to the ECU 90. The ECU 90 can control the driving force applied to the own vehicle 100 by controlling activations of the driving apparatus 11.

The braking apparatus 12 generates a braking force (or a braking torque) for braking the own vehicle 100 and applies the generated braking force to the own vehicle 100 (in particular, each of wheels of the own vehicle 100). The braking apparatus 12 is electrically connected to the ECU 90. The ECU 90 can control the braking force applied to the own vehicle 100 by controlling activations of the braking apparatus 12.

The steering apparatus 13 generates a steering force (or a steering torque) for steering the own vehicle 100 and applies the generated steering force to the own vehicle 100 (in particular, steered wheels of the own vehicle 100). The steering apparatus 13 is electrically connected to the ECU 90. The ECU 90 can control the steering force applied to the own vehicle 100 (in particular, a steering shaft 18 of the own vehicle 100) by controlling activations of the steering apparatus 13.

In addition, a display 14 and a speaker 15 are installed on the own vehicle 100. The display 14 and the speaker 15 are electrically connected to the ECU 90. The ECU 90 can display various images on the display 14 by sending various displaying commands to the display 14. Further, the ECU 90 can output sounds from the speaker 15 by sending various sound outputting commands to the speaker 15.

<Sensors, Etc.>

In addition, various sensors and various sensor apparatuses are installed on the own vehicle 100. In this embodiment, the sensors include an acceleration pedal operation amount sensor 61, a brake pedal operation amount sensor 62, a steering angle sensor 63, a steering torque sensor 64, a vehicle speed sensor 65, a yaw rate sensor 66, and an acceleration sensor 67. Further; the sensor apparatuses include a radar sensor apparatus 71 and a camera sensor apparatus 72.

The acceleration pedal operation amount sensor 61 is electrically connected to the ECU 90. The ECU 90 acquires an operation amount of an acceleration pedal 16 as an acceleration pedal operation amount AP, based on information sent from the acceleration pedal operation amount sensor 61, The ECU 90 controls the activations of the driving apparatus 11 to apply the driving force depending on the acquired acceleration pedal operation amount AP from the driving apparatus 11 to the own vehicle 100.

The brake pedal operation amount sensor 62 is electrically connected to the ECU 90. The ECU 90 acquires an operation amount of a brake pedal 17 as a brake pedal operation amount BP, based on information sent from the brake pedal operation amount sensor 62. The ECU 90 controls the activations of the braking apparatus 12 to apply the braking force depending on the acquired brake pedal operation amount BP from the braking apparatus 12 to the own vehicle 100.

The steering angle sensor 63 is electrically connected to the ECU 90. The ECU 90 acquires a rotation angle of a steering wheel 19 of the own vehicle 100 with respect to a neutral position as a steering angle SA, based on information sent from the steering angle sensor 63. In addition, the ECU 90 acquires a steering angle rate dSA, based on the acquired steering angle SA. The steering angle rate dSA is a change amount of the steering angle SA per unit time or a change rate of the steering angle SA.

The steering torque sensor 64 is electrically connected to the ECU 90. The ECU 90 acquires a torque input by a driver of the own vehicle 100 to the steering shaft 18 via the steering wheel 19 as a driver input torque TQdriver, based on information sent from the steering torque sensor 64.

The vehicle speed sensor 65 is electrically connected to the ECU 90. The ECU 90 acquires rotation speeds Vrot of the wheels of the own vehicle 100, based on information sent from the vehicle speed sensor 65. Then, the ECU 90 acquires a moving speed of the own vehicle 100 as a vehicle speed V100, based on the acquired rotation speeds Vrot of the wheels.

In addition, the ECU 90 calculates an assist steering torque TQassist to be applied to the steering shaft 18 from the steering apparatus 13, based on the acquired steering angle SA, the acquired driver input torque TQdriver, and the vehicle speed V100, The ECU 90 controls activations of the steering apparatus 13 to output the calculated assist steering torque TQassist from the steering apparatus 13. The assist steering torque TQassist assists a steering operation to the steering wheel 19 performed by the driver.

The yaw rate sensor 66 is electrically connected to the ECU 90, The ECU 90 acquires a yaw rate YR of the own vehicle 100, based on information sent from the yaw rate sensor 66.

The acceleration sensor 67 is electrically connected to the ECU 90. In this embodiment, the acceleration sensor 67 is a gyroscope sensor. The acceleration sensor 67 detects an acceleration of the own vehicle 100 in a yaw direction, an acceleration of the own vehicle 100 in a roll direction, and an acceleration of the own vehicle 100 in a pitch direction and sends information on the detected accelerations to the ECU 90. The ECU 90 acquires information on the accelerations of the own vehicle 100 in the yaw, roll, and pitch directions as acceleration information INF_G, based on the information sent from the acceleration sensor 67.

The acceleration sensor 67 may include a longitudinal acceleration sensor and a lateral acceleration sensor. In this case, the acceleration sensor 67 detects a longitudinal acceleration Gx of the own vehicle 100 and a lateral acceleration Gy of the own vehicle 100 and sends information on the detected accelerations Gx and Gy to the ECU 90, The ECU 90 acquires information on the longitudinal and lateral accelerations Gx and Gy of the own vehicle 100 as the acceleration information INF_G, based on the information sent from the acceleration sensor 67.

The radar sensor apparatus 71 includes radar sensors. The radar sensor apparatus 71 is electrically connected to the ECU 90, The radar sensor apparatus 71 detects a situation ahead of the own vehicle 100 by the radar sensors and sends information on the detected situation to the ECU 90. The ECU 90 acquires information on the situation ahead of the own vehicle 100 as radar information INF_R, based on the information sent from the radar sensor apparatus 71.

The camera sensor apparatus 72 includes at least one camera. The camera sensor apparatus 72 is electrically connected to the ECU 90. The camera sensor apparatus 72 takes images by the camera and sends information on the taken images ahead of the own vehicle 100 to the ECU 90. The ECU 90 acquires information on the images ahead of the own vehicle 100 taken by the camera as camera information INF_C, based on the information sent from the camera sensor apparatus 72.

In addition, the ECU 90 recognizes a left white line LM_L and a right white line LM_R which define a moving lane LN_1 of the own vehicle 100 (see FIG. 2A) or an end of a road (a road end) on which the own vehicle 100 moves, based on the camera information INF_C. The white lines LM_L and LM_R are lane markings which define the moving lane LN_1 of the own vehicle 100.

Figure 2A:
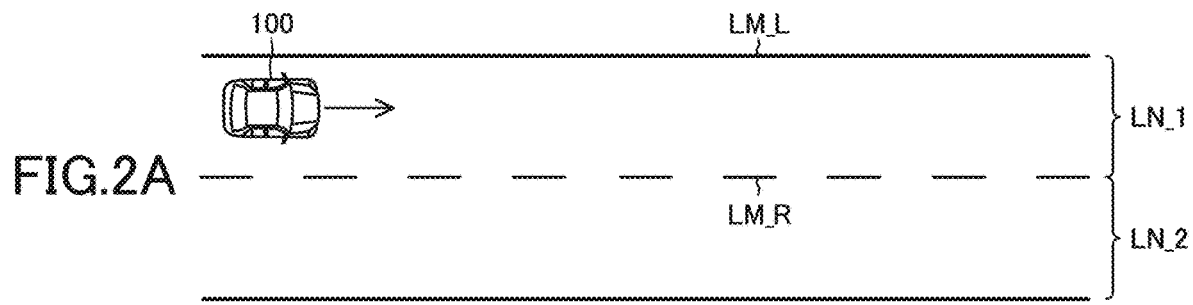
FIG. 2A is a view showing white lines defining a moving lane of the own vehicle.
Figure 2B:
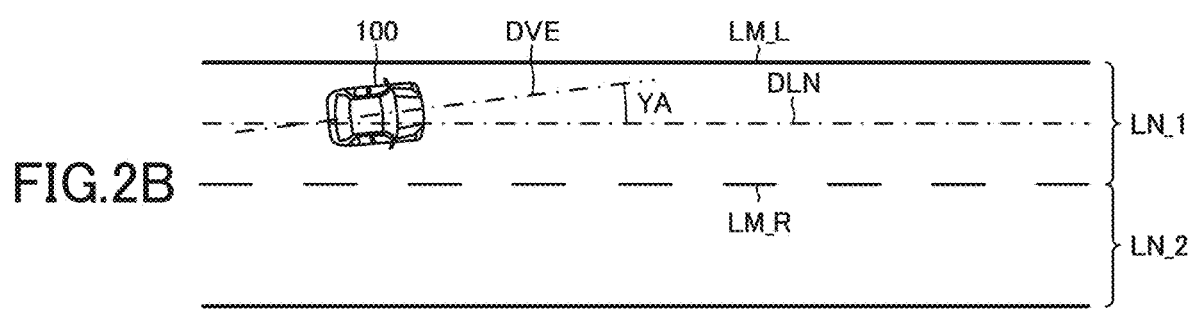
FIG. 2B is a view showing a yaw angle of the own vehicle when the own vehicle directs leftward.
Figure 2C:
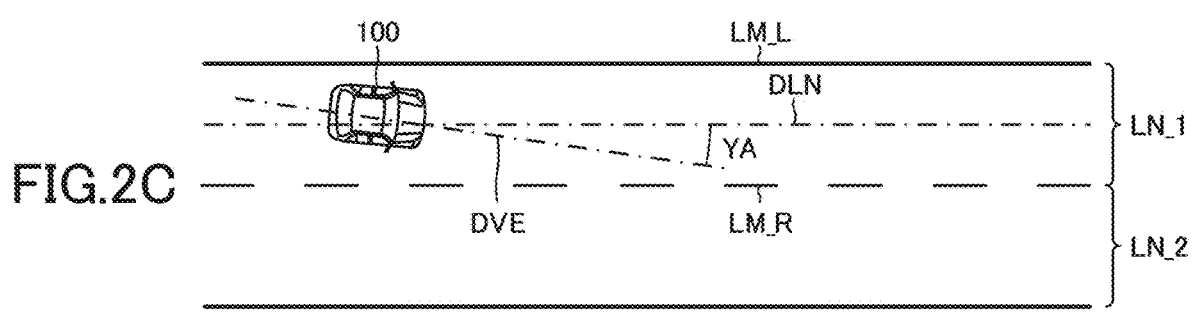
FIG. 2C is a view showing the yaw angle of the own vehicle when the own vehicle directs rightward.

Then, the ECU 90 acquires a yaw angle VA, based on information on the recognized left and right white lines LM_L and LM_R or the road end. As shown in FIG. 2A and FIG. 2B, the yaw angle VA is an angle between (i) a direction DLN in which the moving lane LN_1 of the own vehicle 100 extends and (ii) a direction DVE along a longitudinal center line of the own vehicle 100. In FIG. 2, a lane LN_2 is an oncoming lane next to the moving lane LN_1 of the own vehicle 100.

Hereinafter, the moving lane LN_1 of the own vehicle 100 will be referred to as "own vehicle lane LN_1" and the radar information INF_R and/or the camera information INF_C will be referred to as "own vehicle forward information INF_F".

<GPS Apparatus>

In addition, a GPS apparatus 73 is installed on the own vehicle 100, The GPS apparatus 73 is electrically connected to the ECU 90. The GPS apparatus 73 receives so-called GPS signals and sends the received GPS signals to the ECU 90. The ECU 90 recognizes a position of the own vehicle 100, based on the received GPS signals. In addition, the ECU 90 acquires the yaw angle YA, using the received GPS signals.

<Summary of Operations>

Next, a summary of operations of the vehicle control apparatus 10 will be described. When (i) there is an object such as a human or a bicycle ahead of the own vehicle 100, and (ii) the vehicle control apparatus 10 determines that the own vehicle 100 probably collides with or contact to the object, the vehicle control apparatus 10 executes an alerting control of informing a driver of the own vehicle 100 of a fact that the own vehicle 100 probably collides with or contact to the object.

Then, when (i) a probability that the own vehicle 100 collides with the object ahead of the own vehicle 100, increases to a certain level, and (ii) a control forbidding condition is not satisfied, the vehicle control apparatus 10 executes a steering control of steering the own vehicle 100 for avoiding a collision of the own vehicle 100 with the object. Then, after the collision of the own vehicle 100 with the object has been avoided, the vehicle control apparatus 10 terminates executing the steering control. In this embodiment, the steering control includes a first steering control and a second steering control. Below, the alerting control and the steering control will be described in detail.

Figure 3A:
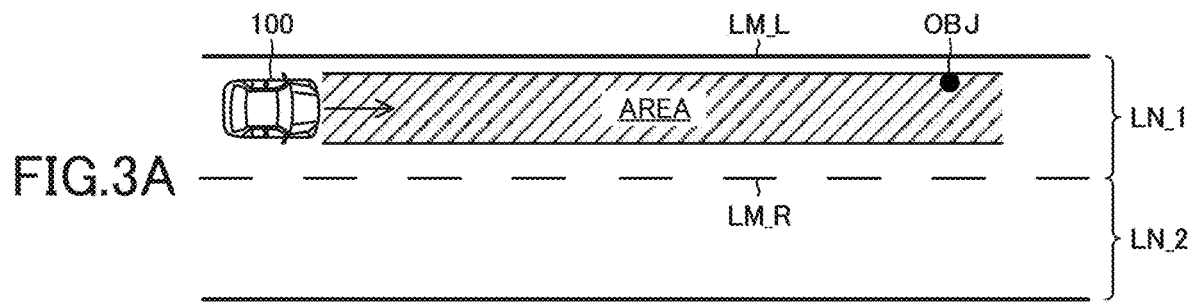
FIG. 3A is a view showing a situation that there is an object ahead of the own vehicle.
Figure 3B:
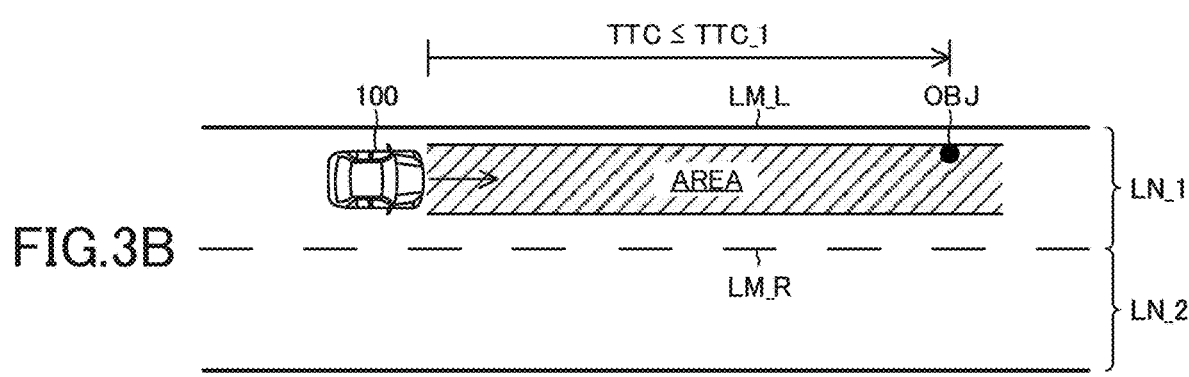
FIG. 3B is a view showing a situation that the own vehicle has approached the object.

The vehicle control apparatus 10 determines whether there is an object OBJ in an area AREA on a moving route of the own vehicle 100 (see FIG. 3A), based on the radar information INF_R and the camera information INF_C. The vehicle control apparatus 10 uses a known technique to determine whether there is an object OBJ in the area AREA on the moving route of the own vehicle 100. The moving route of the own vehicle 100 is a route which the own vehicle 100 moves assuming that the steering angle of the own vehicle 100 is maintained. The area AREA of the moving route of the own vehicle 100 is an area having a width equal to a width of the own vehicle 100 centered at the moving route of the own vehicle 100. Hereinafter, the area AREA will be referred to as "own vehicle moving area AREA".

When the vehicle control apparatus 10 determines that there is an object OBJ in the own vehicle moving area AREA, the vehicle control apparatus 10 acquires a predicted reaching time TTC, based on the radar information INF_R and the vehicle speed V100. The predicted reaching time TIC is a time predicted to take for the own vehicle 100 to reach the object OBJ. The vehicle control apparatus 10 acquires the predicted reaching time TTC, based on (i) a distance between the own vehicle 100 and the object OBJ and (ii) the vehicle speed V100. While the vehicle control apparatus 10 determines that there is the object OBJ in the own vehicle moving area AREA, the vehicle control apparatus 10 acquires the predicted reaching time TIC with a predetermined calculation cycle CYC.

When the vehicle speed V100 is constant, the predicted reaching time TTC decreases as the own vehicle 100 approaches the object OBJ, As shown in FIG. 38, when (i) the own vehicle 100 approaches the object OBJ, and (ii) the predicted reaching time TTC decreases to a predetermined time TTC_1, the vehicle control apparatus 10 determines that an alerting start condition is satisfied and starts executing the alerting control. The alerting control is a control of performing at least one of (i) a process of displaying an alerting image on the display 14 and (ii) a process of outputting alerting sound from the speaker 15. Hereinafter, the predetermined time TTC_1 will be referred to as "alerting start threshold time TTC_1".

When the vehicle control apparatus 10 detects that the driver operates the steering wheel 19 in a direction that the own vehicle 100 passes by the object OBJ without colliding with the object OBJ before the predicted reaching time TTC decreases to a predetermined time TTC_2 shorter than the alerting start threshold time TTC_1 after the vehicle control apparatus 10 starts executing the alerting control, the vehicle control apparatus 10 determines that a first steering control start condition becomes satisfied.

When the vehicle control apparatus 10 determines that the first steering control start condition becomes satisfied, the vehicle control apparatus 10 determines whether the steering control forbidding condition is satisfied. Below, a process of determining whether the steering control forbidding condition is satisfied, will be described.

The vehicle control apparatus 10 determines whether there is an oncoming vehicle 200 which satisfies a predetermined moving condition, based on the own vehicle forward information INF_F. In this embodiment, the predetermined moving condition is a condition that the vehicle moves in the oncoming lane LN_2 next to the own vehicle lane LN_1, approaching the own vehicle 100.

When the vehicle control apparatus 10 determines that there is an oncoming vehicle 200 satisfying the predetermined moving condition, the vehicle control apparatus 10 determines that the steering control forbidding condition becomes satisfied. The steering control forbidding condition is a condition for forbidding executing the first and second steering control described later.

In addition, the vehicle control apparatus 10 determines whether a first time T1 elapses since the oncoming vehicle 200 determined as the oncoming vehicle satisfying the predetermined moving condition disappears.

The first time T1 is set, for example, to a time minimally necessary to (i) prevent the vehicle control apparatus 10 from mistakenly determining that there is no oncoming vehicle 200 satisfying the predetermined moving condition although actually there is an oncoming vehicle 200 satisfying the predetermined moving condition, and (ii) enable the vehicle control apparatus 10 to determine that there is another oncoming vehicle 200 satisfying the predetermined moving condition when there is the other oncoming vehicle 200 satisfying the predetermined moving condition right behind the preceding oncoming vehicle 200 which is determined as the oncoming vehicle satisfying the predetermined moving condition and has disappeared.

When the vehicle control apparatus 10 determines that the first time T1 elapses since the vehicle control apparatus 10 determines that the oncoming vehicle 200 determined as the oncoming vehicle 200 satisfying the predetermined moving condition, disappears, the vehicle control apparatus 10 determines that a forbidding cancelling condition becomes satisfied. When the vehicle control apparatus 10 determines that the forbidding cancelling condition becomes satisfied, the vehicle control apparatus 10 determines that the steering control forbidding condition is not satisfied.

In addition, when the vehicle control apparatus 10 determines that there is no oncoming vehicle 200 satisfying the predetermined moving condition, the vehicle control apparatus 10 determines that the steering control forbidding condition is not satisfied.

It should be noted that the predetermined moving condition of this embodiment includes only a condition that the vehicle moves, approaching the own vehicle 100. In this connection, the predetermined moving condition may further include one or more of (i) a condition that the vehicle control apparatus 10 has determined for a second time T2 that there is an oncoming vehicle 200 moving and approaching the own vehicle 100, (ii) a condition that a distance Dx (see FIG. 4) in the direction DLN in which the own vehicle lane LN_1 extends between the own vehicle 100 and the oncoming vehicle 200, is equal to or shorter than a first distance D1, (iii) a condition that a distance Dy (see FIG. 4) between the white line LM_R (or the lane marking) between the oncoming lane LN_2 and the own vehicle lane LN_1 and the oncoming vehicle 200, is equal to or shorter than a second distance D2, and (iv) a condition that a moving speed V200 of the own vehicle 100 is equal to or higher than a predetermined moving speed V_th.

The second time T2 is set, for example, to a time minimally necessary to prevent the vehicle control apparatus 10 from mistakenly determining that there is an oncoming vehicle 200 satisfying the predetermined moving condition although actually there is no oncoming vehicle 200 satisfying the predetermined moving condition. In this embodiment, the second time T2 is set to a time shorter than the first time T1.

The first distance D1 is set, for example, to a distance minimally necessary to prevent the own vehicle 100 from contacting to or colliding with the oncoming vehicle 200 while the first or second steering control is executed. The vehicle control apparatus 10 acquires the distance Dx between the own vehicle 100 and the oncoming vehicle 200, based on the own vehicle forward information INF_F.

Also, the second distance D2 is set, for example, to a distance minimally necessary to prevent the own vehicle 100 from contacting to or colliding with the oncoming vehicle 200 while the first or second steering control is executed. The second distance D2 is significantly shorter than the first distance D1. The vehicle control apparatus 10 acquires the distance Dy between (i) the white line LM_R (or the lane marking) separating the own vehicle lane LN_1 from the oncoming lane LN_2 and (ii) the oncoming vehicle 200, based on the own vehicle forward information INF_F.

The predetermined moving speed V_th is set, for example, to an upper limit speed to surely avoid the contact or collide of the own vehicle 100 to or with the oncoming vehicle 200 while the first or second steering control is executed. The vehicle control apparatus 10 acquires the moving speed V200 of the oncoming vehicle 200, based on the own vehicle forward information INF_F.

In addition, the predetermined moving condition may include a condition that the distance Dx (see FIG. 4) between the own vehicle 100 and the oncoming vehicle 200 is equal to or longer than a third distance D3. The third distance D3 is set, for example, to a short distance enough to prevent the own vehicle 100 from contacting to or colliding with the oncoming vehicle 200 if executing the first or second steering control is started. The third distance D3 is shorter than the first distance D1.

In addition, the predetermined moving condition may include a condition that the oncoming lane LN_2 in which the oncoming vehicle 200 moves, is on the right side of the own vehicle lane when a recommended route Rrec or a target route Rtgt described later is a route passing on the right side of the object OBJ, and the oncoming lane LN_2 in which the oncoming vehicle 200 moves, is on the left side of the own vehicle lane LN_1 when the recommended route Rrec or the target route Rtgt is a route passing on the left side of the object OBJ.

When the vehicle control apparatus 10 determines that (i) the first steering control start condition becomes satisfied, and (ii) the steering control forbidding condition is satisfied, the vehicle control apparatus 10 does not start executing the first steering control.

On the other hand, when the vehicle control apparatus 10 determines that (i) the first steering control start condition becomes satisfied, and (ii) the steering control forbidding condition is not satisfied, the vehicle control apparatus 10 starts executing the first steering control. In addition, the vehicle control apparatus 10 starts executing the first steering control when the vehicle control apparatus 10 determines that (i) the steering control forbidding becomes unsatisfied, (ii) the first steering control start condition is satisfied, and (iii) a second steering control start condition described later is not satisfied, after the vehicle control apparatus 10 determines that (i) the first steering control start condition becomes satisfied, (ii) the steering control forbidding condition is satisfied, and (iii) the vehicle control apparatus 10 does not start executing the first steering control.

Figure 3C:
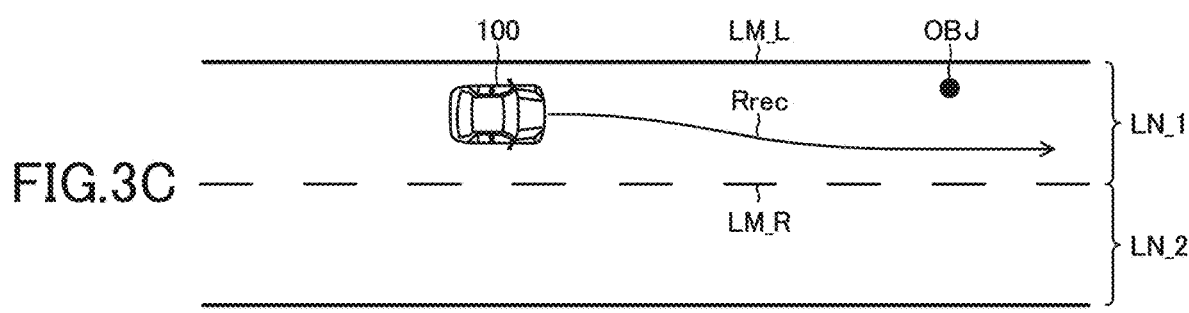
FIG. 3C is a view showing a recommended route.

The first steering control is a control of determining a recommended route Rrec recommended for moving the own vehicle 100 with avoiding the collision of the own vehicle 100 with the object OBJ by calculation as shown in FIG. 3C, and increasing and decreasing the assist steering torque TQassist, depending on the driver input torque TQdriver so as to move the own vehicle 100, keeping a distance from the recommended route Rrec within a predetermined distance. In other words, the first steering control is a control of controlling the assist steering torque TQassist so as to move the own vehicle 100, keeping the distance from the recommended route Rrec within the predetermined distance in consideration of the driver input torque TOdriver without ignoring the driver input torque TQdriver.

In this embodiment, the vehicle control apparatus 10 determines a route for moving the own vehicle 100 so as to pass by the object OBJ with avoiding the collision of the own vehicle 100 with the object OBJ and moving the own vehicle 100 within the own vehicle lane LN_1 (i.e., without moving the own vehicle 100 out of the own vehicle lane LN_1) as the recommended route Rrec.

Further, in this embodiment, the vehicle control apparatus 10 determines a route depending on the operation to the steering wheel 19 performed by the driver as the recommended route Rrec. In particular, the vehicle control apparatus 10 determines a route passing a right side of the object OBJ as the recommended route Rrec when the driver rotates the steering wheel 19 clockwise. On the other hand, the vehicle control apparatus 10 determines a route passing a left side of the object OBJ as the recommended route Rrec when the driver rotates the steering wheel 19 counterclockwise.

The vehicle control apparatus 10 cancels executing the first steering control when the vehicle control apparatus 10 cannot set the recommended route Rrec, for example, due to a fact that the own vehicle lane LN_1 of the own vehicle 100 is too narrow.

In addition, the vehicle control apparatus 10 cancels executing the first steering control when the driver input torque TQdriver becomes equal to or greater than a relatively large predetermined steering torque TQ_th while the vehicle control apparatus 10 executes the first steering control.

It should be noted that in this embodiment, the vehicle control apparatus 10 determines that an alerting termination condition is satisfied and terminates executing the alert control when the vehicle control apparatus 10 starts executing the first steering control.

Thereby, when the steering forbidding condition is satisfied, the first steering control is not executed. In other words, when there is a probability that the own vehicle 100 contacts to or collide with the oncoming vehicle 200, or the own vehicle 100 passes right near the own vehicle 100 if the first steering control is executed to move the own vehicle 100 to avoid the collision of the own vehicle 100 with the object OBJ, the first steering control is not executed. Thus, the collision of the own vehicle 100 with the object OBJ can be safely avoided with avoiding a collision of the own vehicle 100 with the oncoming vehicle 200.

On the other hand, when the vehicle control apparatus 10 does not detect that the driver operates the steering wheel 19 in the direction that the own vehicle 100 passes by the object OBJ without colliding with the object OBJ before the predicted reaching time TTC decreases to the predetermined time TTC_2 (the second steering control start time TTC_2) shorter than the alerting start threshold time TTC_1 after the vehicle control apparatus 10 starts executing the alerting control, the vehicle control apparatus 10 determines that a second steering control start condition becomes satisfied.

When the vehicle control apparatus 10 determines that the second steering control start condition becomes satisfied, the vehicle control apparatus 10 determines whether the steering control forbidding condition is satisfied.

When the vehicle control apparatus 10 determines that (i) the second steering control start condition becomes satisfied, and (ii) the steering control forbidding condition is satisfied, the vehicle control apparatus 10 does not start executing the second steering control.

On the other hand, when the vehicle control apparatus 10 determines that (i) the second steering control start condition becomes satisfied, and (ii) the steering control forbidding condition is not satisfied, the vehicle control apparatus 10 starts executing the second steering control. In addition, the vehicle control apparatus 10 starts executing the second steering control when the vehicle control apparatus 10 determines that (i) the steering control forbidding becomes unsatisfied, and (ii) the second steering control start condition is satisfied, after the vehicle control apparatus 10 determines that (i) the second steering control start condition becomes satisfied, (ii) the steering control forbidding condition is satisfied, and (iii) the vehicle control apparatus 10 does not start executing the second steering control.

Figure 3D:
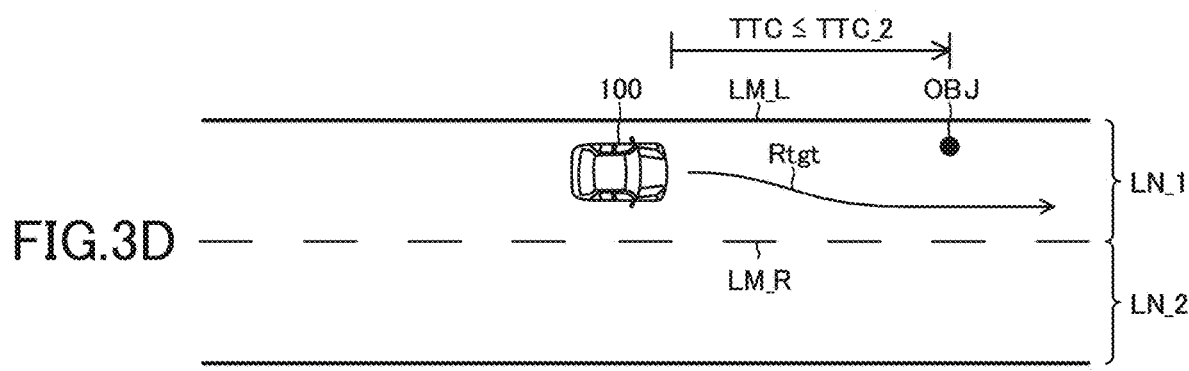
FIG. 3D is a view showing a target route.

The second steering control is a control of determining a target route Rtgt for moving the own vehicle 100 with avoiding the collision of the own vehicle 100 with the object OW by calculation as shown in FIG. 3D, and controlling the assist steering torque TQassist so as to move the own vehicle 100 along the target route Rtgt. In other words, the second steering control is a control of controlling the assist steering torque TQassist so as to move the own vehicle 100 along the target route Rtgt with ignoring the driver input torque TQdriver.

In this embodiment, the vehicle control apparatus 10 determines a route for moving the own vehicle 100 so as to pass by the object OW with avoiding the collision of the own vehicle 100 with the object OBJ and moving the own vehicle 100 within the own vehicle lane LN_1. (i.e., without moving the own vehicle 100 out of the own vehicle lane LN_1) as the target route Rtgt.

The vehicle control apparatus 10 cancels executing the second steering control when the vehicle control apparatus 10 cannot set the target route Rtgt, for example, due to the face that the own vehicle lane LN_1 of the own vehicle 100 is too narrow.

In addition, the vehicle control apparatus 10 cancels executing the second steering control when the driver input torque TQdriver becomes equal to or greater than the relatively large predetermined steering torque TQ_th while the vehicle control apparatus 10 executes the second steering control.

It should be noted that in this embodiment, the vehicle control apparatus 10 determines that the alerting termination condition is satisfied and terminates executing the alert control when the vehicle control apparatus 10 starts executing the second steering control.

Thereby, when the steering forbidding condition is satisfied, the second steering control is not executed. In other words, when there is a probability that the own vehicle 100 contacts to or collide with the oncoming vehicle 200, or the own vehicle 100 passes right near the own vehicle 100 if the second steering control is executed to steer the own vehicle 100 to avoid the collision of the own vehicle 100 with the object OBJ, the second steering control is not executed, Thus, the collision of the own vehicle 100 with the object OBJ can be safely avoided with avoiding a collision of the own vehicle 100 with the oncoming vehicle 200.

<Termination of Steering Control>

After the vehicle control apparatus 10 starts executing the first steering control, the vehicle control apparatus 10 monitors whether a steering control termination condition is satisfied. The steering control termination condition is satisfied when the yaw angle VA becomes equal to or smaller than a predetermined yaw angle YA_th. In particular, the steering control termination condition is satisfied when an absolute value of the yaw angle VA becomes equal to or smaller than the predetermined yaw angle YA_th. The vehicle control apparatus 10 continues executing the first steering control as long as the steering control termination condition is not satisfied. On the other hand, when the steering control termination condition is satisfied, the vehicle control apparatus 10 terminates executing the first steering control.

Also, after the vehicle control apparatus 10 starts executing the second steering control, the vehicle control apparatus 10 monitors whether the steering control termination condition is satisfied. The vehicle control apparatus 10 continues executing the second steering control as long as the steering control termination condition is not satisfied. On the other hand, when the steering control termination condition is satisfied, the vehicle control apparatus 10 terminates executing the second steering control.

<Specific Operations>

Next, specific operations of the vehicle control apparatus 10 will be described. The CPU of the ECU 90 of the vehicle control apparatus 10 is configured or programmed to execute a routine shown in FIG. 5 each time a predetermined time elapses. Thus, at a predetermined timing, the CPU starts executing a process from a step 500 in FIG. 5 and proceeds with the process to a step 510 to execute a routine shown in FIG. 6.

Figure 6:
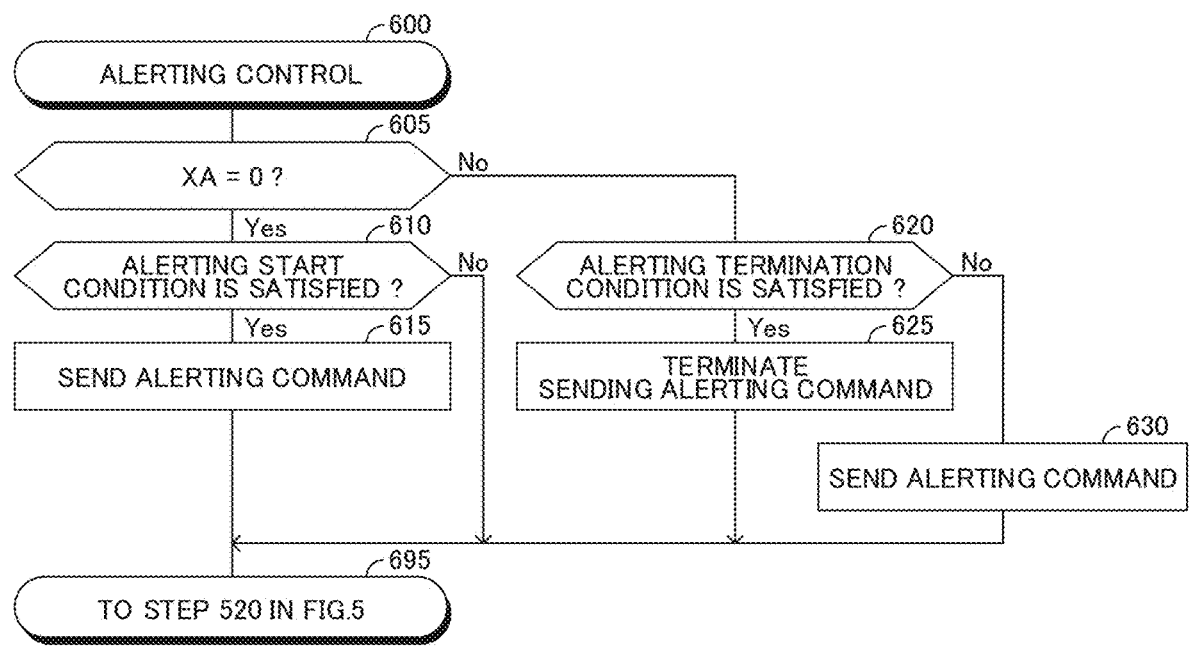
FIG. 6 is a view showing a flowchart of a routine executed by the vehicle control apparatus according to the embodiment of the invention.

The CPU starts executing a process of the routine shown in FIG. 6 from a step 600 and proceeds with the process to a step 605 to determine whether a value of an alerting executing flag XA is "0". The value of the alerting executing flag XA is set to "1" when the CPU starts executing the alerting control. On the other hand, the value of the alerting executing flag XA is set to "0" when the CPU terminates executing the alerting control.

When the CPU determines "Yes" at the step 605 (i.e., the alerting control is not executed), the CPU proceeds with the process to a step 610 to determine whether the alerting start condition is satisfied.

When the CPU determines "Yes" at the step 610, the CPU proceeds with the process to a step 615 to send an alerting command to the speaker 15. Thereby, outputting the alerting sound from the speaker 15 is started. Then, the CPU proceeds with the process to a step 520 in FIG. 5 via a step 695.

Figure 5:
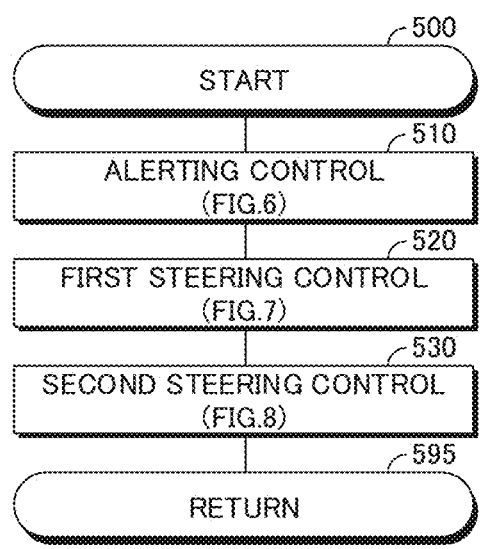
FIG. 5 is a view showing a flowchart of a routine executed by the vehicle control apparatus according to the embodiment of the invention.

On the other hand, when the CPU determines "No" at the step 610, the CPU proceeds with the process to the step 520 in FIG. 5 via the step 695.

When the CPU determines "No" at the step 605 (i.e., the alerting control is executed), the CPU proceeds with the process to a step 620 to determine whether the alerting termination condition is satisfied.

When the CPU determines "Yes" at the step 620, the CPU proceeds with the process to a step 625 to terminate sending the alerting command to terminate executing the alerting control. Then, the CPU proceeds with the process to the step 520 in FIG. 5 via the step 695.

On the other hand, when the CPU determines "No" at the step 620, the CPU proceeds with the process to a step 630 to send the alerting command to the speaker 15. Thereby, outputting the alerting sound from the speaker 15 is continued. Then, the CPU proceeds with the process to the step 520 in FIG. 5 via the step 695.

Figure 7:
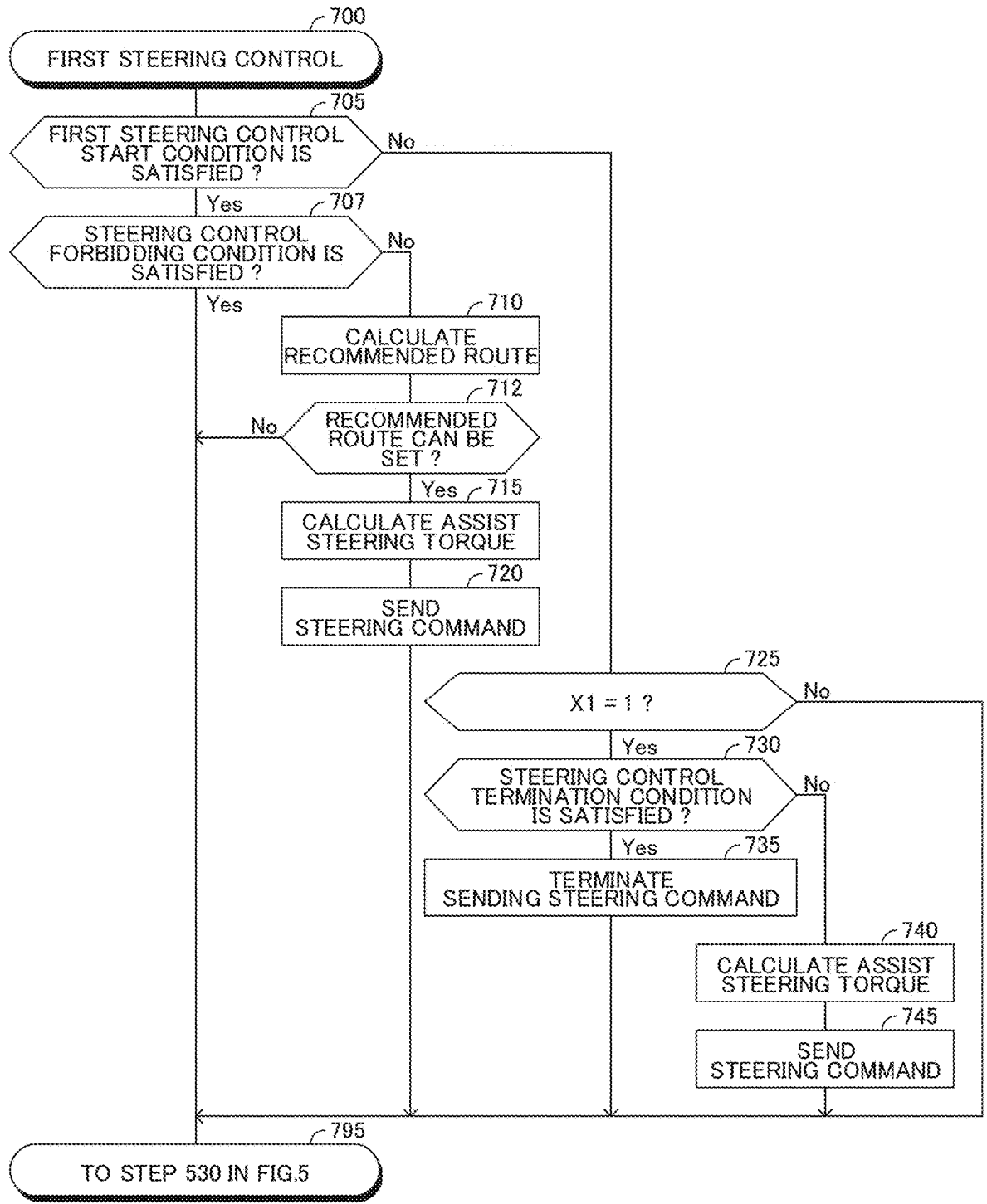
FIG. 7 is a view showing a flowchart of a routine executed by the vehicle control apparatus according to the embodiment of the invention.

When the CPU proceeds with the process to the step 520 in FIG. 5, the CPU executes a routine shown in FIG. 7. The CPU starts executing a process of the routine shown in FIG. 7 from a step 700 and proceeds with the process to a step 705 to determine whether the first steering control start condition is satisfied.

When the CPU determines "Yes" at the step 705, the CPU proceeds with the process to a step 707 to determine whether the steering control forbidding condition is satisfied.

When the CPU determines "Yes" at the step 707, the CPU proceeds with the process to a step 530 in FIG. 5 via a step 795. In this case, executing the first steering control is not started.

On the other hand, when the CPU determines "No" at the step 707, the CPU proceeds with the process to a step 710 to calculate the recommended route Rrec, Next, the CPU proceeds with the process to a step 712 to determines whether the recommended route Rrec can be set.

When the CPU determines "Yes" at the step 712, the CPU proceeds with the process to a step 715 to calculate the assist steering torque TQassist, based on the recommended route Rrec, the steering angle SA, the driver input torque TQdriver, and the vehicle speed V100. Next, the CPU proceeds with the process to a step 720 to send a steering command to the steering apparatus 13 for outputting the assist steering torque TQassist calculated at the step 715 from the steering apparatus 13, Thereby, the assist steering torque TQassist calculated at the step 715 is output from the steering apparatus 13. Then, the CPU proceeds with the process to the step 530 in FIG. 5 via the step 795.

On the other hand, when the CPU determines "No" at the step 712, the CPU proceeds with the process to the step 530 in FIG. 5 via the step 795. In this case, executing the first steering control is substantially cancelled.

When the CPU determines "No" at the step 705 (i.e., the first steering control has been executed or is not executed), the CPU proceeds with the process to a step 725 to determine whether a value of a first steering executing flag X1 is "1". The value of the first steering executing flag X1 is set to "1" when the CPU starts executing the first steering control. On the other hand, the value of the first steering executing flag X1 is set "0" when the CPU terminates executing the first steering control.

When the CPU determines "Yes" at the step 725, the CPU proceeds with the process to a step 730 to determine whether the steering control termination condition is satisfied.

When the CPU determines "Yes" at the step 730, the CPU proceeds with the process to a step 735 to terminate sending the steering command to terminate executing the first steering control. Then, the CPU proceeds with the process to the step 530 in FIG. 5 via the step 795.

On the other hand, when the CPU determines "No" at the step 730, the CPU proceeds with the process to a step 740 to calculate the assist steering torque TQassist, based on the recommended route Rrec, the steering angle SA, the driver input torque Mdriver; and the vehicle speed V100, Next, the CPU proceeds with the process to a step 745 to send the steering command to the steering apparatus 13 for outputting the assist steering torque TQassist calculated at the step 740 from the steering apparatus 13. Thereby, the assist steering torque TQassist calculated at the step 740 is output from the steering apparatus 13. Then, the CPU proceeds with the process to the step 530 in FIG. 5 via the step 795.

When the CPU determines "No" at the step 725, the CPU proceeds with the process to the step 530 in FIG. 5 via the step 795.

Figure 8:
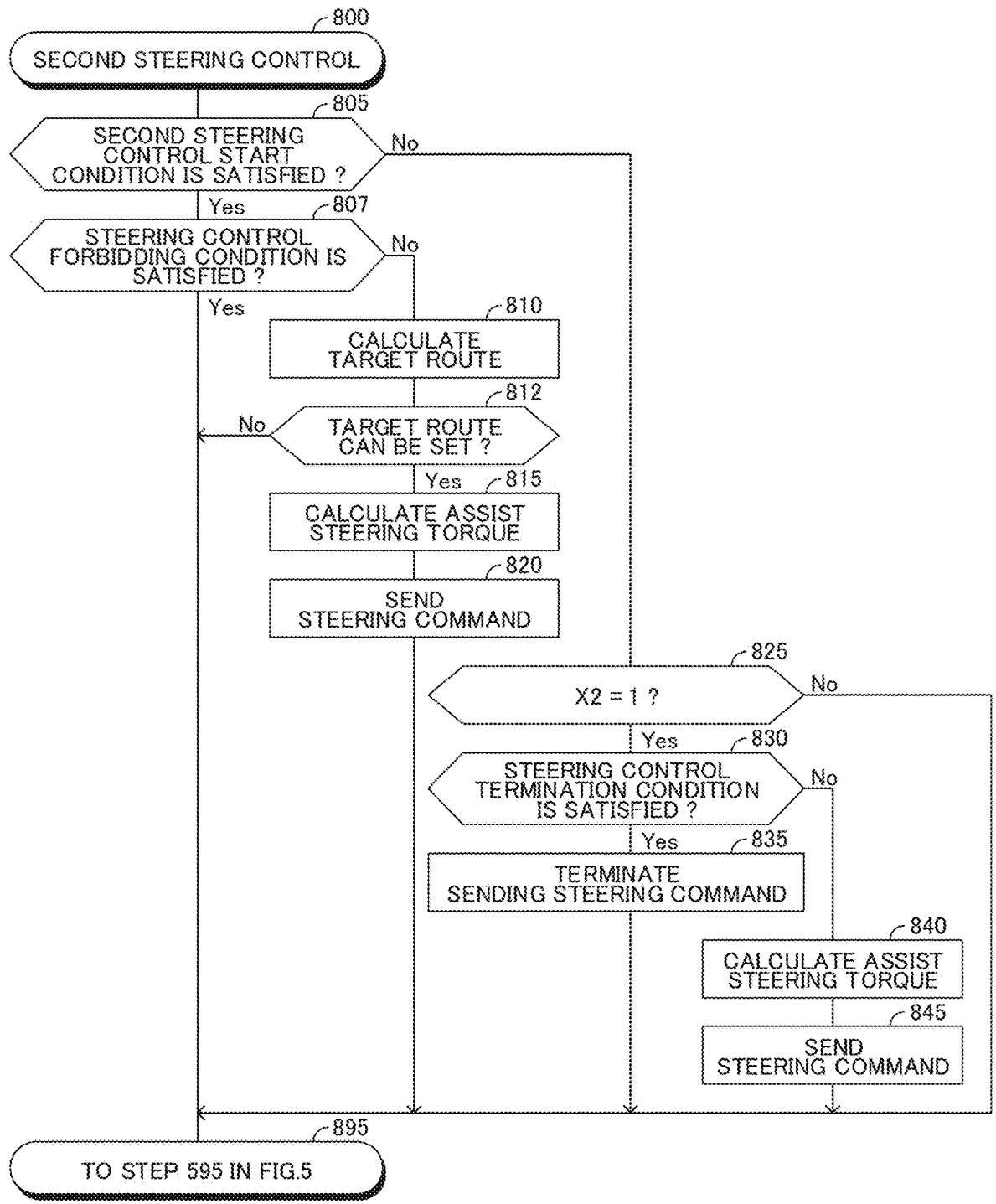
FIG. 8 is a view showing a flowchart of a routine executed by the vehicle control apparatus according to the embodiment of the invention.

When the CPU proceeds with the process to the step 530 in FIG. 5, the CPU execute a routine shown in FIG. 8. The CPU starts executing a process of the routine shown in FIG. 8 from a step 800 and proceeds with the process to a step 805 to determine whether the second steering control start condition is satisfied.

When the CPU determines "Yes" at the step 805, the CPU proceeds with the process to a step 807 to determine whether the steering control forbidding condition is satisfied.

When the CPU determines "Yes" at the step 807, the CPU proceeds with the process to a step 595 in FIG. 5 via a step 895. In this case, executing the second steering control is not started.

On the other hand, when the CPU determines "No" at the step 807, the CPU proceeds with the process to a step 810 to calculate the target route Rtgt. Next, the CPU proceeds with the process to a step 812 to determine whether the target route Rtgt can be set.

When the CPU determines "Yes" at the step 812, the CPU calculates the assist steering torque TQassist, based on the target route Rtgt, the steering angle SA, and the vehicle speed V100. Next, the CPU proceeds with the process to a step 820 to send the steering command to the steering apparatus 13 for outputting the assist steering torque TQassist calculated at the step 815 from the steering apparatus 13. Thereby, the assist steering torque TQassist calculated at the step 815 is output from the steering apparatus 13. Then, the CPU proceeds with the process to a step 595 in FIG. 5 via a step 895 to terminate executing this routine once.

On the other hand, when the CPU determines "No" at the step 812, the CPU proceeds with the process to the step 595 in FIG. 5 via the step 895 to terminate executing this routine once. In this case, executing the second steering control is substantially cancelled.

When the CPU determines "No" at the step 805 (i.e., the second steering control has been executed or is not executed), the CPU proceeds with the process to a step 825 to determine whether a value of a second steering executing flag X2 is "1" The value of the second steering executing flag X2 is set to "1" when the CPU starts executing the second steering control. On the other hand, the value of the second steering executing flag X2 is set to "0" when the CPU terminates executing the second steering control.

When the CPU determines "Yes" at the step 825, the CPU proceeds with the process to a step 830 to determine whether the steering control termination condition is satisfied.

When the CPU determines "Yes" at the step 830, the CPU proceeds with the process to a step 835 to terminate sending the steering command to terminate executing the second steering control. Then, the CPU proceeds with the process to the step 595 in FIG. 5 via the step 895 to terminate executing this routine once.

On the other hand, when the CPU determines "No" at the step 830, the CPU proceeds with the process to a step 840 to calculate the assist steering torque Massist, based on the target route Rtgt, the steering angle SA, and the vehicle speed V100. Next, the CPU proceeds with the process to a step 845 to send the steering command to the steering apparatus 13 to output the assist steering torque TQassist calculated at the step 840 from the steering apparatus 13. Thereby, the assist steering torque TQassist calculated at the step 840 is output from the steering apparatus 13. The, the CPU proceeds with the process to the step 595 in FIG. 5 via the step 895 to terminate executing this routine once.

When the CPU determines "No" at the step 825, the CPU proceeds with the process to the step 595 in FIG. 5 via the step 895 to terminate executing this routine once.

The specific operations of the vehicle control apparatus 10 have been described.

It should be noted that the invention is not limited to the aforementioned embodiments, and various modifications can be employed within the scope of the invention.

What is claimed is:

1. A vehicle control apparatus, comprising:
at least one sensor which detects own vehicle forward information on a situation ahead of an own vehicle; and
an electronic control unit configured to execute a steering control for avoiding a collision of the own vehicle with an object recognized, based on the own vehicle forward information,
wherein the electronic control unit is configured to:
determine that a control start condition is satisfied when the at least one sensor detects the object in an area of a moving route of the own vehicle;
determine that a control forbidding condition is satisfied only when the at least one sensor detects an oncoming vehicle which satisfies a predetermined moving condition, the predetermined moving condition being that the at least one sensor detects that the oncoming vehicle moves in an oncoming lane next to a moving lane of the own vehicle and approaches the own vehicle both at an initial detection and at a second detection, the second detection taking place when a second time period elapses from the initial detection;
determine that a forbidding cancelling condition is satisfied when a first time period elapses since the electronic control unit determines that the oncoming vehicle satisfying the predetermined moving condition disappears after the electronic control unit determines that the control forbidding condition is satisfied;
execute the steering control without delay when the control start condition is satisfied, and the control forbidding condition is not satisfied; and
execute the steering control with delay when the control start condition is satisfied, the control forbidding condition is satisfied, and the forbidding cancelling condition is satisfied;
wherein the second time period is a time period sufficient to prevent the electronic control unit from mistakenly determining that the oncoming vehicle is present when the oncoming vehicles actually is not present.

2. The vehicle control apparatus as set forth in claim 1, wherein the predetermined moving condition includes a condition that a distance between the own vehicle and the oncoming vehicle in a direction which the moving lane of the own vehicle extends, is equal to or shorter than a first distance.

3. The vehicle control apparatus as set forth in claim 1, wherein the predetermined moving condition includes a condition that a moving speed of the oncoming vehicle is equal to or higher than a predetermined speed.

4. The vehicle control apparatus as set forth in claim 1, wherein the predetermined moving condition includes a condition that a distance between (i) a lane marking separating the moving lane of the own vehicle from the oncoming lane and (ii) the oncoming vehicle, is equal to or longer than a second distance.

5. The vehicle control apparatus as set forth in claim 1, wherein the electronic control unit is configured to:
set a route of moving the own vehicle for avoiding the collision of the own vehicle to the object as a recommended route when the control start condition is satisfied; and
execute the steering control so as to assist operations to a steering wheel of the own vehicle performed by a driver of the own vehicle to move the own vehicle along the recommended route.

6. The vehicle control apparatus as set forth in claim 5, wherein the predetermined moving condition includes (i) a condition that the recommended route is a route passing a right side of the object, and the oncoming lane is next to and on a right side of the moving lane of the own vehicle and (ii) a condition that the recommended route is a route passing a left side of the object, and the oncoming lane is next to and on a left side of the moving lane of the own vehicle.

7. The vehicle control apparatus as set forth in claim 1, wherein the electronic control unit is configured to:
set a route of moving the own vehicle for avoiding the collision of the own vehicle to the object as a target route when the control start condition is satisfied; and
execute the steering control so as to move the own vehicle along the target route.

8. The vehicle control apparatus as set forth in claim 7, wherein the predetermined moving condition includes (i) a condition that the target route is a route passing a right side of the object, and the oncoming lane is next to and on a right side of the moving lane of the own vehicle and (ii) a condition that the target route is a route passing a left side of the object, and the oncoming lane is next to and on a left side of the moving lane of the own vehicle.

9. The vehicle control apparatus as set forth in claim 1, wherein the second time period is less than the first time period.

* * * * *